United States Patent Office 3,584,370
Patented June 15, 1971

3,584,370
BONDING OF PYROLYTIC GRAPHITE
Arthur W. Moore and Herbert F. Volk, Parma, Ohio, assignors to Union Carbide Corporation
No Drawing. Filed June 7, 1968, Ser. No. 735,173
Int. Cl. B23k 31/02
U.S. Cl. 29—472.9                                   19 Claims

ABSTRACT OF THE DISCLOSURE

A method for bonding pyrolytic graphite segments together is provided. A specific bonding agent selected from boron, boron compounds, moylbdenum, and silicon carbide is placed between the segments and the joint is heated to a suitable temperature while a pressure of at least 100 pounds per square inch is compressively applied in a non-reactive atmosphere.

FIELD OF INVENTION

This invention relates to a method of bonding layers of pyrolytic graphite together to form a strong, thick pyrolytic graphite product.

Pyrolytic graphite is essentially a highly oriented polycrystalline graphite produced by high temperature pyrolysis techniques. Althought pyrolytic graphite has been known for many years, only in more recent years has it been demonstrated that massive, coherent deposits thereof can be produced by the thermal decomposition of a carbonaceous gas on a suitable substrate or mandrel heated to various elevated temperatures. The deposited pyrolytic graphite can be seperated from the substrate to form coherent, free-standing masses or bodies of various shapes and sizes.

Briefly, the pyrolytic deposition process may be carried out in a furnace wherein, at a suitable pressure, a hydrocarbon gas such as methane, natural gas, benzene or the like is thermally decomposed at the surface of a substrate of suitable shape, size and material, e.g., graphite heated, for instance, by appropriate induction or resistance means, to a temperature between about 1500° C. and 3000° C., and preferably between about 1900° and 2500° C. The pyrolysis is continued until pyrolytic graphite of the desired thickness is obtained. The substrate, if desired, may then be removed or separated from the pyrolytic graphite. The pyrolytic material formed in the above manner is spectroscopically pure carbon, approaches theoretical density, is monolithic, free of voids or pores, gas impervious, much stronger than normal graphites and anisotropic.

Under the above described process conditions, as the hydrocarbon gas is thermally decomposed, pure carbon atoms are deposited layer by layer on the substrate. As the carbon atoms are deposited they link up to form layer planes of hexagonal arrays or networks of carbon atoms, the distance between carbon atoms along the hexagon sides being about 1.42 angstroms. These layer planes of hexagonally arranged carbon atoms are oriented or ordered so as to be parallel to each other and to the surface of the substrate upon which they are deposited. The sheets or layers of carbon atoms, usually referred to as basal planes, are linked or bonded together and groups thereof are arranged in crystallites, the number and size of basal planes in a particular crystalline increasing as the deposition temperature increases. The spacing between adjacent or neighboring linked layers of basal planes ($c/2$ spacing) may vary from about 3.35 to about 3.42 angstroms. In considering pyrolytic graphite structure two directions are usually noted, that is, the $a$ direction which is parallel to the deposition surface and the $c$ direction which is perpendicular to the deposition surface.

Pyrolytic graphite thus may be characterized as a laminated structure of graphite consisting of more or less well ordered or oriented crystallites composed of parallel basal planes of carbon atoms in hexagonal arrays, the basal planes also tending to be oriented or aligned parallel to the substrate or surface of deposit.

Due to its unique properties, pyrolytic graphite is useful in numerous applications, particularly at high temperatures. However, many other applications are untried or impractical because of the difficulty experienced in attempting to produce pyrolytic graphite with a thickness dimension of greater than about one-half inch. Consequently, various products with dimensions greater than this must be produced by bonding layers of pyrlytic graphite together.

DESCRIPTION OF PRIOR ART

Many methods have been proposed in the past for joining carbon or graphite to other materials of carbon, graphite, metals, ceramics, and the like. Such proposals have generally envisioned the use of tar, pitch, resins, and other adhesives as illustrated in U.S. Pats. 473,841; 947,008; 1,158,171; 2,412,081; 2,670,311; and 2,513,230. Such adhesives function satisfactorily at relatively low temperatures, e.g. up to about 400° F., but lose their strength at higher temperatures and hence have only a limited applicability. Others have suggested the use of inorganic bonding materials such as sodium silicate, as in U.S. Pat. 1,709,892, or elemental bonding agents such as selenium, or tellurium, as in British Pat. 604,293. A more recent proposal involves the use of a solder based on a metal such as copper and a refractory bonding material such as titanium hydride or zirconium hydride, as described in U.S. Pat. 2,570,248. One common difficulty with each of the foregoing has been inability of the joint to perform at elevated temperatures. Another disadvantage inherent in many such joints arises from the presence of a foreign material other than carbon, at the joint.

Recent patents such as U.S. Pats. 2,979,813 and 2,979,814 attempt to overcome the foregoing disadvantages when graphite is joined to graphite by using in place of an adhesive, a material capable of entering into chemical combination with the graphite such as a carbide forming element whose carbide contains a variable amount of carbon and must be capable of precipitating as graphite under the processing conditions. Even further development is shown in U.S. Pat. 3,101,403 wherein metals of Groups IV–A, V–A and VI–A of the Periodic Table are caused to diffuse into the carbon or graphite surfaces for a time sufficient to secure more than a superficial penetration of the metal into the surface of the material at a temperature sufficient to effect the formation of the carbide of the metal at points within the body of the carbon or graphite.

While these advancements in the art are quite applicable for use with conventional polycrystalline graphite, they are generally not effective with pyrolytic graphite which is impervious, highly anisotropic and undergoes large dimensional and property changes upon annealing.

Pyrolytic graphite is quite incompatible with organic binders for a number of reasons. For example, volatile materials which must be removed during the initial stages of curing and coking cannot escape through the impervious pyrolytic graphite, but only along the bond area thereby disrupting the bond. In addition, the high thermal expansion coefficient of such coked and graphitized bonds is disadvantageous since it is not comparable to the expansion of pyrolytic graphite under similar conditions. Furthermore, the bonding agent cannot penetrate the graphite, as is possible with conventional graphite, to form a mechanically interlocking bond.

Nor are the aforementioned teachings which are directed to the bonding of graphite by metals which react to form carbides helpful. Polycrystalline graphite is porous and bonds can be readily achieved by penetration of the molten bonding agent into the graphite pores whereas pyrolytic graphite is pore-free and the bonding action depends on the adhesion between the relatively flat pyrolytic graphite surface and the bonding agent. Furthermore, in comparison with conventional polycrystalline graphite, the basal plane surface of pyrolytic graphite (which have to be bonded together in order to make a thick sample) are very resistant to chemical attack. Only those metals which are exceptionally reactive with graphite will attack appreciably this type of surface at other than extremely high temperatures.

It is therefore the primary object of this invention to provide a method of bonding pyrolytic graphite together whereby a bond having structural integrity, thermal shock resistance, high strength, and no deterioration upon heating to fabrication temperatures above 2100° C. is produced.

SUMMARY OF THE INVENTION

Broadly the method of the invention comprises placing a layer of bonding material selected from the group consisting of boron; boron compounds such as BN, $B_4C$, $TiB_2$, and $LaB_6$, and refractory borides; molybdenum; silicon carbide; mixtures of boron carbide and silicon carbide and mixtures of boron and boron carbide between surfaces of the pyrolytic graphite to be joined, applying a compression pressure of at least 100 pounds per square inch to the graphite pieces, and simultaneously heating the joint to a suitable temperature in a non-reactive atmosphere. If boron or boron compounds are used, a temperature of at least 2100° C. is required; for molybdenum at least 2350° C. is required; and for silicon carbide a temperature in the range of between about 2100° C. and 2600° C. is preferred. The bonding material may be in the form of a powder or wafer or the like and should be between about .001 inch and about .010 inch in thickness for best results.

The time of processing varies with the material employed, but generally between one-half hour and four hours is sufficient to establish a successful bond. In addition, the surfaces of the pyrolytic graphite to be joined should be flat and substantially parallel to effect the most tenacious bond.

In order to test the effectiveness of the invention, a variety of tests were carried out on many types of bonds including those of the invention and many prior art materials. The test conditions, equipment and results are as follows:

STARTING MATERIALS

Two hundred plates of regenerative nucleated pyrolytic graphite material measuring approximately 3¾ inches in diameter and ½ inch thick were prepared for bonding tests. In addition, several smaller ¼–⅜" thick plates of boronated pyrolytic graphite were obtained. The plates were machined flat and any gross defects near the surface were trimmed off. For the most of the trial runs, one-inch diameter pyrolytic graphite was used. Seven one-inch diameter discs were cut from each 3¾ inch plate (one at the axis of the plate and six around the periphery). In other trial runs, 3¾ inch plates were bonded and seven one-inch diameter test pieces machined from the bonded material.

All pyrolytic graphite discs except those used in a few orienting experiments were ultrasonically inspected. In these tests, control specimens of pyrolytic graphite with holes 1/32 inch diameter and larger were used for comparing and estimating the size of faults in the pieces tested. Approximately one-half of the regenerative pyrolytic graphite samples were free of faults larger than 1/16 inch diameter and approximately 15 percent were free of faults larger than 1/32 inch diameter. No material having faults larger than 1/16 inch diameter was used in the testing.

BONDING AGENTS

Two principal methods of bonding pyrolytic graphite were investigated. In one the bonding agent consisting of either prepolymerized furfuryl alcohol or pitch and a filler of ground natural graphite was applied to the pyrolytic graphite surfaces. The assembly was cured at approximately 150° C. under approximately 30 lb./in.$^2$ pressure, coked slowly to 800° C. without pressure, and finally heated to 2200°–3000° C. under a pressure of 150 lb./in.$^2$ or more. These materials were not successful as a bonding agent. Depending upon the amount of filler used, bonds with strength up to 500 lb./in.$^2$ could be obtained after coking at 800° C. However, it was found that the results were very erratic and sensitive to experimental technique. In only one case was the tensile strength of such bonded pyrolytic graphite as high as 200 lb./in.$^2$ after heating to 2200° C.; and, after the samples were heated to 3000° C., the strength never exceeded 80 lb./in.$^2$.

In the other bonding method, an element or compound capable of entering into chemical reaction with the pyrolytic graphite at elevated temperatures was placed on the mating pyrolytic graphite surfaces and the assembly heated to temperatures above 2000° C. at pressures up to 2500 lb./in.$^2$ as shown in the various tables hereinafter set forth. The bonding agents were normally applied as fine powders (particle sizes ranging from 170 to 800 Tyler mesh) which had been formed into a paste by admixing with xylene. In some cases (particularly boron nitride) foils of 2–10 mils thickness were also used.

BONDING CONDITIONS

Temperatures ranged from 2100° to 3200° C., uniaxial pressures from 150 to 2500 lb./in.$^2$, and duration of processing from one-half to 4½ hours as shown in the Tables.

All 3¾ inch diameter samples were pressure bonded for one hour in a verticle induction furnace in argon at temperatures ranging from 2350° to 3000° C. and at pressures of 200 to 1500 lb./in.$^2$ In both furnaces, as many as 12 bonds were produced in a single run, though there is no obvious limit to the number of bonds which can be formed. When the pyrolytic graphite sample was relatively thick (approximately ½ inch), several discs were bonded into a single column and the test samples obtained by cleaving or cutting the pyrolytic graphite mid-way between the bonds. With thinner samples, the column was made up of separate bonded pairs of pyrolytic graphite discs.

TENSILE TESTS

Most of the samples were tested for room temperature "c-axis" direction tensile strength. A gauge section of 0.70 inch diameter and, where possible, ⅛ inch long, was machined into one inch diameter discs. In bonded pyrolytic graphite, the samples were machined so that the bond was in the gauge section. The tensile test samples were mounted with epoxy on steel or brass grips. Loading rate and gauge diameter varied from 60–600 lbs./minute and 0.40–0.90 inch respectively, but most tests were run on a Baldwin machine at 100 lbs./minute using samples with a 0.70 inch gauge diameter. The same tests were also applied to conventional (ATJ) graphite which had been bonded as above described.

The results of the tests are shown in the following tables. Table I shows the data accumulated with respect to bonding agents of the invention selected from boron and boron compounds.

TABLE I

| Bonding agent | Process conditions | | | Shrinkage of pyrolytic graphite (percent) | Tensile strength c-axis for bonded pyrolytic graphite, (p.s.i.) | |
|---|---|---|---|---|---|---|
| | Temperature, °C. | Pressure (p.s.i.) | Duration (hours) | | Average | Number of samples |
| B₄C | 2,100 | 2,000 | 1.5 | 0 | 933 | 2 |
| | 2,350 | 1,000 | 1.5 | 1.6 | 953 | 2 |
| | 2,350 | 1,500 | 1–1.5 | 1.2 | ¹800–1,200 | 48 |
| | 2,450 | 1,500 | 1 | 3.3 | 725 | 2 |
| | 2,900 | 200 | 1 | 11.0 | 186 | 2 |
| Boron | 2,350 | 1,000 | 1.5 | 2.0 | 944 | 2 |
| | 2,350 | 1,500 | 1.2 | 1.2 | 860 | 2 |
| | 2,450 | 1,000 | 1.5 | 5.0 | 851 | 2 |
| | 2,450 | 1,500 | 1 | 3.3 | 1,020 | 11 |
| | 2,600 | 150 | 1.5 | 5.6 | 454 | 2 |
| | 2,900 | 300 | 1 | 10.7 | 238 | 2 |
| BN powder | 2,600 | 150 | 1.5 | 4.2 | 529 | 2 |
| 7 mil PBN ² | 2,550 | 150 | 4 | 4.9 | 671 | 2 |
| 6 mil PBN ² | 2,600 | 150 | 1.5 | 5.2 | 669 | 2 |
| | 2,700 | 150 | 1 | 7.3 | 632 | 2 |
| | 2,750 | 400 | 1 | 7.6 | 507 | 2 |
| 6.5 mil PBN ² | 2,900 | 350 | 1 | 11.3 | 295 | 2 |
| 7 mil PBN ² | 3,200 | 150 | 0.5 | 12.6 | 278 | 2 |
| | 3,000 | 250 | 1 | 12.3 | 267 | 6 |
| TiB₂ | 3,000 | 350 | 1 | 13.7 | 249 | 3 |
| LaB₆ | 2,900 | 350 | 1 | 6.6 | 471 | 2 |
| 85 SiC:15 B₄C ³ | 2,200 | 1,500 | 1.5 | 0 | 689 | 2 |
| | 2,350 | 1,000 | 1.5 | 1.4 | 917 | 2 |
| | 2,500 | 1,000 | 1.5 | 2.0 | 965 | 4 |

¹ Range.
² Represents thickness in mils of wafer of pyrolytic boron nitride.
³ Proportions are parts by weight.

Table II sets forth other compositions which are successful as bonding agents for pyrolytic graphite.

TABLE II

| Bonding agent | Process conditions | | | Shrinkage of pyrolytic graphite (percent) | Tensile strength pyrolytic graphite (p.s.i.) | |
|---|---|---|---|---|---|---|
| | Temperature (°C.) | Pressure (p.s.i.) | Duration (hours) | | Average | Number samples |
| Mo | 2,350 | 1,500 | 1.5 | 1.0 | 975 | 2 |
| | 2,500 | 1,000 | 1.5 | 2.9 | 747 | 3 |
| | 2,600 | 1,000 | 1 | 6.4 | 951 | 4 |
| | 2,900 | 200 | 1 | 11.4 | 324 | 3 |
| SiC | 2,100 | 2,000 | 1.5 | 0 | 1,040 | 2 |
| | 2,200 | 2,000 | 1.5 | 0 | 880 | 2 |
| | 2,350 | 1,000 | 1.5 | 1.6 | 1,012 | 2 |
| | 2,450 | 1,000 | 1.5 | 3.3 | 754 | 2 |
| | 2,600 | 150 | 1.5 | 5.3 | 457 | 2 |
| | 2,900 | 200 | 1 | 11.0 | 20 | 2 |

The amount (in percent) of permanent shrinkage of the pyrolytic graphite in the "c-axis" direction as a result of bonding conditions was measured for every run and is also shown in the Tables. This property is a measure of the amount of anealing experienced by the pyrolytic graphite as a result of the processing.

Table III lists various carbide forming elements and compounds which have not been found to be successful for bonding pyrolytic graphite but are excellent bonding agents for conventional graphite. Tensile strength comparisons between pyrolytic graphite bond and conventional (ATJ) graphite bonds are also included.

TABLE III

| Bonding agent | Processing conditions °C. | P.s.i. (hrs.) | Shrinkage of pyrolytic graphite (percent) | C-axis tensile strength of bonded PG (p.s.i.) | Tensile strength of bonded ATJ (p.s.i.) |
|---|---|---|---|---|---|
| Si | 2,100 | 300 (1) | 0 | No bond | No bond. |
|  | 2,350 | 1,000 (1½) | 1.9 | 280,322(301) |  |
|  | 2,450 | 1,000 (1½) | 5.0 | 172,BH |  |
|  | 2,450 | 1,500 (1) |  |  | 565B, 1197B (881). |
|  | 2,900 | 200 (1) | 11.6 | 68,120,18,100(79) | 328B,262B (295). |
| Ti | 2,350 | 1,500 (1½) | 1.0 | No bond |  |
|  | 2,600 | 2,000 (1½) | 8.9 | 296,BH | 1,570G, 1,330G (1,450). |
| Zr | 2,350 | 1,500 (1) | 0.9 | 51,43, BH(43) | 1,234G, 1,114G (1,174). |
|  | 2,900 | 200 (1) | 11.0 | 16,BH |  |
| Hf | 2,600 | 500 (1½) | 5.1 | 65,15(40) | 820B,790B (805) |
| V | 2,400 | 500 (1½) | 1.2 | 100,BH | 860G, 1290G (1,075) |
|  | 2,600 | 1,000 (1½) | 7.9 | 35,221,BH(128) |  |
| Nb | 2,600 | 1,000 (1) | 6.4 | No bond | 693B,491B (592) |
| Ta | 2,600 | 1,500 (1½) | 8.0 | do | 595G, 1,450G (1,023) |
|  | 2,900 | 200 (1) | 11.0 | do |  |
| Cr | 2,100 | 1,000 (1½) | 0 | 190,88(139) | No bond. |
| W | 2,600 | 1,500 (1½) | 8.0 | 125,BH | 1,006G,1,750G (1,378). |
|  | 2,900 | 200 (1) | 11.0 | 242,104 (173) |  |
| Al | 2,100 | 500 (1½) | 0 | No bond | No bond. |
| Mg | 2,100 | 100 (1½) | 0 | do | Do. |
| Fe | 2,100 | 300 (1) | 0 | 242,BH | 470B,416B (443) |
|  | 2,200 | 1,500 (1½) |  |  | 656B, 668B (662) |
| $Al_2O_3$ | 2,900 | 500 (1) | 13.0 | No bond |  |
| $SiO_2$ | 2,950 | 500 (1) | 13.9 | do |  |
| $ZrO_2$ | 2,975 | 300 (1) | 12.5 | 127,BH |  |
|  | 2,600 | 2,000 (1½) | 8.9 | No bond | 1,195G,1,527G (1,361). |
| $ZrH_2$ | 2,500 | 150 (1) | 3.4 | do |  |
| $FlO_2$ | 2,600 | 1,000 (1) | 6.4 | do | No bond. |
|  | 2,600 | 500 (1½) | 5.2 | do | 820B,1,030B (925). |
| $V_2O_5$ | 2,600 | 1,000 (1) | 5.2 | do | 1,590G,1,750G (1,670). |
| ZrC | 2,550 | 2,000 (1½) | 6.6 | 94,258,91,95(135) |  |
| TaC | 2,750 | 1,000 (1) | 11.0 | No bond |  |

NOTE:
B Broke at bond.
BH = Broke in handling.
G = Broke in bulk ATJ.

Table IV indicates the results obtained when pyrolytic graphite was bonded to form a 3½ inch long by 3½ inch diameter block. The variation in average bond strength is due to axial thermal gradient in the hot pressing furnace. Nevertheless, the tensile strength for a block of this size indicates the important improvements achieved.

are quite unsuccessful when used with pyrolytic graphite. Thus, virtually all of the bonding agents which have been indicated in the prior art as useful for bonding carbon or graphite materials are shown in Table III to provide a weak bond or no bond at all when used with pyrolytic graphite.

TABLE IV.—TENSILE STRENGTH OF A 3.5" LONG BY 3.5" DIAMETER BLOCK OF BONDED PYROLYTIC GRAPHITE

[7 plates pyrolytic graphite bonded at 2,400° C., 1,500 lbs./in.², one hour. Average shrinkage 0.6%]

| Bonding agent | Bond No. | Bond type | "C-axis" tensile strength (lb./in.²) Individual results | | | | | | | Average |
|---|---|---|---|---|---|---|---|---|---|---|
| $B_4C$ | 1 | F | 495 | 402 | 805 | 512 | 895 | 745 | 865 | 675 |
| 50 $B_4C$:50 [1] boron | 2 | B | 805 | 542 | 1,080 | 560 | 1,025 | 790 | 785 | 800 |
|  | 3 | F | 702 | 765 | 1,140 | 895 | 905 | 713 | 860 | 855 |
| $B_4C$ | 4 | B | 1,300 | 1,030 | 1,105 | 885 | 1,145 | 1,230 | 1,135 | 1,120 |
|  | 5 | F | 860 | 725 | 885 | 760 | 890 | 875 | 820 | 830 |
| 50 $B_4C$:50 [1] boron | 6 | B | 645 | 710 | 480 | 480 | 480 | 720 | 515 | 575 |

NOTE:
[1] = Proportions are parts by weight.
F = "Deposition" surfaces mating.
B = Surfaces nearest substrate mating.

As indicated in the foregoing tables, boron, boron compounds, silicon carbide and molybdenum are outstanding materials for bonding pyrolytic graphite. The room temperature c-axis tensile strength of pyrolytic graphite bonded with these agents is far superior to any such bond heretofore attempted. An analysis of Table III indicates that while many other bonding agents provide excellent bonds when employed with conventional graphite, they

What is claimed is:
1. A method for forming a bond between pyrolytic graphite pieces comprising, placing a bonding agent between said pieces said bonding agent being selected from the group consisting of boron; boron compounds selected from the group consisting of $B_4C$, BN, $LaB_6$, $TiB_2$; molybdenum, and silicon carbide, mixtures of boron carbide and silicon carbide and mixtures of boron and boron carbide; applying a compression pressure of at least 100 pounds per square inch to said pyrolytic graphite pieces while simultaneously heating said bonding agent in a non reactive atmosphere to a temperature of at least 2100° C. for boron and boron compounds, at least 2350° C. for molybdenum and between 2100° C. and 2600° C. for silicon carbide.

2. The method of claim 1 wherein said bonding agent has a thickness dimension of between 0.001 inch and 0.01 inch.

3. The method of claim 2 wherein the step of providing said pyrolytic graphite pieces with substantially flat parallel surfaces adjacent said bonding agent is added.

4. The method af claim 2 wherein the duration of applying the heat and pressure is between one-half hour and four hours.

5. The method of claim 1 wherein said bonding agent is $B_4C$, the temperature is 2350° C., the pressure is 1500 pounds per square inch and the duration of heat and pressure application is 1.5 hours.

6. The method of claim 1 wherein said bonding agent is $B_4C$, the temperature is 2100° C., the pressure is 2000 pounds per square inch and the duration of heat and pressure application is 1.5 hours.

7. The method of claim 1 wherein the bonding agent is boron, the temperature is 2350° C., the pressure is 1000 pounds per square inch and the duration of heat and pressure application is 1.5 hours.

8. The method of claim 1 wherein the bonding agent is boron, the temperature is 2450° C., the pressure is 1500 pounds per square inch, and the duration of heat and pressure application is 1 hour.

9. The method of claim 1 wherein the bonding agent is 6 mil thick wafer of pyrolytic boron nitride, the temperature is 2600° C., the pressure is 150 pounds per square inch and the duration of heat and pressure application is 1.5 hours.

10. The method of claim 9 wherein the temperature is 2700° C., and the duration of heat and pressure application is 1 hour.

11. The method of claim 1 wherein the bonding agent is 7 mil thick wafer of pyrolytic boron nitride, the temperature is 3200° C., the pressure is 150 pounds per square inch and the duration of heat and pressure application is 0.5 hour.

12. The method of claim 1 wherein the bonding agent is silicon carbide, the temperature is 2100° C., the pressure is 2000 pounds per square inch and the duration of heat and pressure application is 1.5 hours.

13. The method of claim 12 wherein the temperature is 2350° C. and the pressure is 1000 pounds per square inch.

14. The method of claim 12 wherein the temperature is 2450° C.

15. The method of claim 1 wherein said bonding agent is molybdenum, the temperature is 2350° C., the pressure is 1500 pounds per square inch and the duration of heat and pressure application is 1.5 hours.

16. The method of claim 15 wherein the temperature is 2600° C., the pressure is 1000 pounds per square inch and the duration of heat and pressure application is 1 hour.

17. The method of claim 1 wherein the bonding agent is 50 parts by weight $B_4C$ and 50 parts by weight boron, the temperature is 2400° C., the pressure is 1500 pounds per square inch, and the duration of heat and pressure application is 1 hour.

18. The method of claim 1 wherein the bonding agent is 85 parts by weight SiC and 15 parts by weight $B_4C$, the temperature is 2500° C., the pressure is 1000 pounds per square inch, and the duration of heat and pressure application is 1.5 hours.

19. The method of claim 18 wherein the temperature is 2350° C.

References Cited

UNITED STATES PATENTS

| | | | |
|---|---|---|---|
| 2,979,813 | 4/1961 | Steinberg | 29—472.7X |
| 2,979,814 | 4/1961 | Steinberg | 29—472.7X |
| 3,442,006 | 5/1969 | Guichet et al. | 29—472.7 |

FOREIGN PATENTS

| | | | |
|---|---|---|---|
| 1,379,684 | 9/1963 | France | 29—472.7 |

JOHN F. CAMPBELL, Primary Examiner

R. J. SHORE, Assistant Examiner

U.S. Cl. X.R.

29—473.1, 497.5, 498, 504